June 5, 1928.
G. P. STEGNER
HORSE COLLAR PAD
Filed July 11, 1927
1,672,474
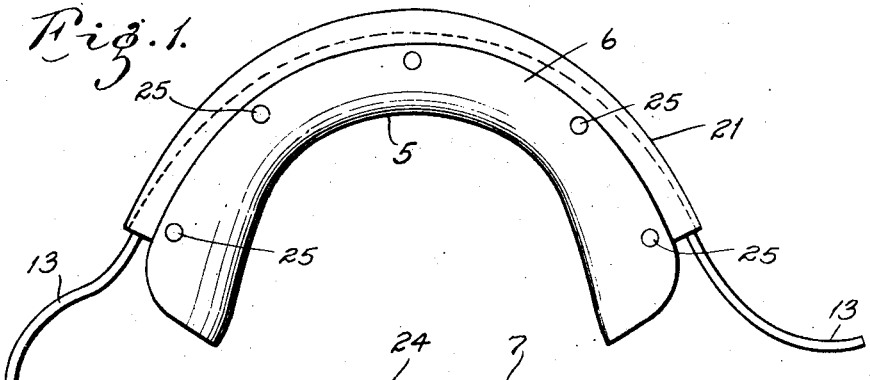
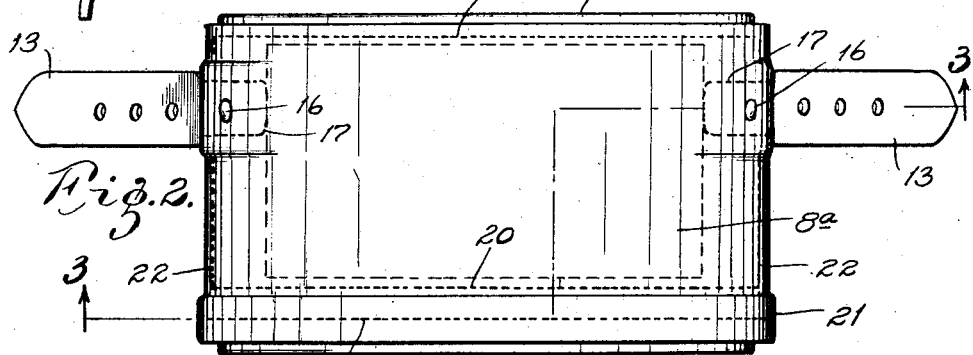
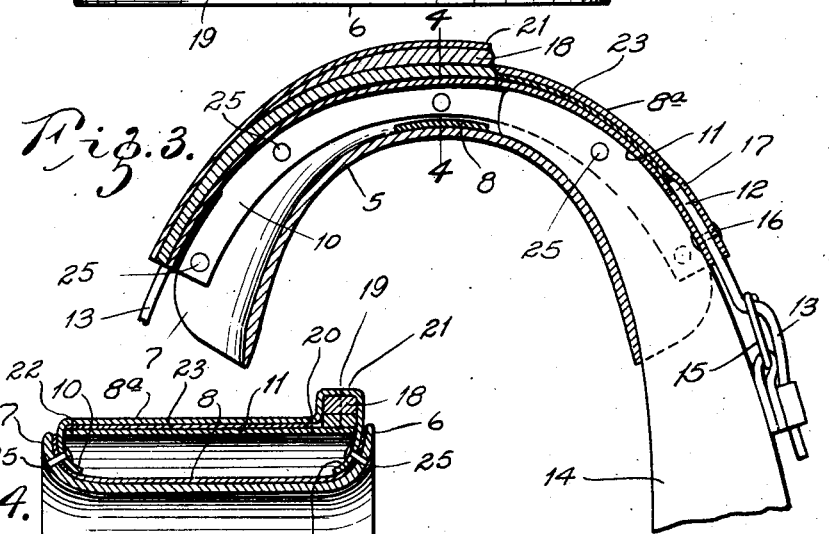
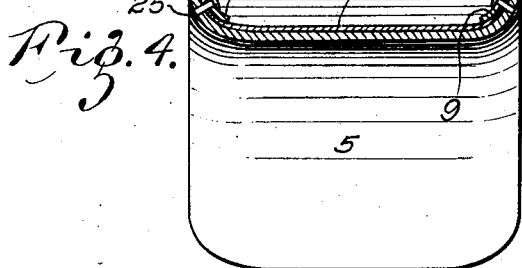
INVENTOR:
GEORGE P. STEGNER.
BY Edward E. Longan
ATTORNEY.

Patented June 5, 1928.

1,672,474

UNITED STATES PATENT OFFICE.

GEORGE P. STEGNER, OF CALIFORNIA, MISSOURI, ASSIGNOR TO WILLIAM HECK SADDLERY COMPANY, OF CALIFORNIA, MISSOURI, A CORPORATION OF MISSOURI.

HORSE-COLLAR PAD.

Application filed July 11, 1927. Serial No. 204,707.

My invention relates to improvements in horse collar pads, and has for its primary object a pad in which all possibility of breaking down and the consequent chafing of the horse's neck is eliminated.

A further object is to construct a horse collar pad in which the side walls are reinforced so that the free ends of the horse collar are prevented from working forward and backward and breaking down the side walls of the pad.

A still further object is to construct a horse collar pad in which the top and bottom walls are reinforced by means of metal plates so that all possibility of these walls collapsing is prevented. I have found that in pads as ordinarily constructed the side walls break down very quickly and chafe the horse's neck causing sore spots. I have also found that the pressure of the hame straps causes the top wall of the pad to break down making it difficult to insert the ends of the collar and I have also found that the central portion of the bottom wall of the pad, that is that portion which rests on the horse's neck collapses and pinches the neck. All of these various defects are caused by the fact that the pad being formed of leather absorbs sweat from the horse and becomes softened. The ends of the collar are merely held in the pad by means of straps which permits the ends to work backward and forward, and when the side walls of the pad becomes softened due to moisture they break down as do the top and bottom walls. Then when the harness is hung away over night, the pad stiffens in the broken down position and when again used it has set and become hard, and being out of shape chafes and digs into the horse's neck causing sores and preventing the horse from being worked regularly.

This invention is an improvement on Letters Patent No. 1,562,129 issued to me November 17th, 1925.

In the drawings:

Fig. 1 is a side elevation of my device;

Fig. 2 is a top plan view of the same;

Fig. 3 is a section taken on the line 3—3 of Fig. 2 and showing one end of the collar in position in the pad; and Fig. 4 is a section taken on the line 4—4 of Fig. 3.

In the construction of my device I employ a bottom member or wall 5 which is preferably arcuate as illustrated in Figs. 1 and 3 and which has its longitudinal edges bent upward so as to form walls 6 and 7 so that the arcuate member 5 will be substantially U shaped in cross section. Midway the ends of the member 5 and located on its upper surface is a plate or stiffening member 8. This member follows the cross sectional contour of the member 5 and tends to stiffen it so as to prevent all possibility of a breakdown.

Secured to the member 5 is a top member 8ª which has side walls 9 and 10. These side walls extend downward and fit inside of the side walls 6 and 7 formed on the bottom member. Secured to the underside of the member 8 and between the walls 9 and 10 is a stiffening member 11. This member is formed of leather as are the portions 8ª and 5, while the portion 8 is preferably of metal. Secured between the top 8ª and the stiffening member 11 are the ends 12 of the straps 13. These straps extend from each end of the pad as illustrated in Figs. 1 and 2 and are for the purpose of securing the collar 14 to the pad. The collar is provided with buckles 15 to which the straps 13 are secured. The straps 13 are secured in position by means of rivets 16 and by means of stitching 17.

Between the members 8ª and 11 I also place a welt 18 which is positioned along the forward edge of the top member. See Figs. 2 and 4. This welt is formed of leather or other material so that a line of stitching 19 can be run through the top member 8ª, the welt 18 and the reinforcing member 11 thus securing the same together at one operation.

Immediately to the rear of the welt 18 is a line of stitching 20. This draws down the top member close against the welt so as to form a square shoulder and by forming this square shoulder all possibility of the hame strap climbing the welt or ridge 21 is eliminated. This is a serious defect in horse collar pads employing a round welt since there was always a possibility of the hame strap creeping up over the top of such welt but the square shoulder will prevent all of this. The ends of the members 8ª and 11 are stitched together by means of stitching 22.

When the top member has been thus far formed, I insert a metallic plate 23 between the members 8ª and 11 and between the ends 12 of the straps 13. I then run a line of stitching 24 along the rear edge of the upper member thus firmly uniting the members 8ª and 11 together along all edges. The plate 23 is held against any movement whatsoever by means of the ends 12 of the straps 13 and the lines of stitching 20 and 24.

After the upper member has been thus formed, the edges 9 and 10 are placed in the position illustrated in Fig. 4 and rivets 25 are used to secure the two members together, certain of these rivets also securing the reinforcing strap or plate 8 in position on the bottom member. In this way an arcuate tubular member open at the ends only is formed and in which the side walls are so secured together that there will be no open spaces whatever for the ends of the collar to work through and break down the side walls. Furthermore by stiffening the top and bottom member by means of metallic plates, any breaking down of these members, either laterally or longitudinally, is prevented so that a smooth round undersurface will always rest on the horse's neck and the top face of the collar pad will always be smooth and not break down, and by forming a square shoulder on the welt all possibility of the hame strap creeping over the welt is eliminated so that the hames will always stay in position.

While I have shown the collar adjustably secured to the pad by means of buckles, still it is obvious that any other fastening means may be employed without departing from the spirit of my invention. My purpose in adjustably securing the collar to the pad is so that the same collar can be used for various horses or in other words the collar be adjustable as to size. For instance a 19 inch collar will be capable of being adjusted to 20 and 21 inches. This eliminates the necessity of having a large number of various size collars, or in fact, if a collar is used on a young horse it can be adjusted in size as the animal grows thus obviating the necessity of buying new collars and destroying perfectly good collars on account of them getting too small for the animal.

It will be noted particularly from Fig. 4 that the welt or ridge 21 is rectangular in cross section and along the forward edge of the top member.

Having fully described my invention, what I claim is:—

1. A horse collar pad comprising an arcuate tubular member open at both ends only and having its sides and top reinforced, a metallic plate carried by the top of said pad for further stiffening the same, means located at each end of the top of said tubular member for attaching the same to a horse collar, and a welt substantially rectangular in cross section located on the upper surface of said tubular member for holding a hame strap in position, said welt gradually tapering downward toward its ends.

2. A horse collar pad comprising an arcuate bottom member having its longitudinal edges upturned, a top member having its longitudinal edges downturned, said last mentioned edges adapted to fit snugly within and against the first mentioned edges whereby a tubular member having reinforced side walls is formed, a strap secured to each end of the top member, said straps adapted to secure the pad to a horse collar, and a longitudinally extending outwardly projecting welt having a vertical edge formed integral with the top member and along one edge thereof, said welt gradually decreasing in height toward its ends.

3. A horse collar pad comprising an arcuate bottom member having its longitudinal edges upturned, a metallic member midway the ends of said bottom member for reinforcing the same, a top member having its longitudinal edges downturned, said last mentioned edges adapted to fit snugly within and against the first mentioned edges whereby a tubular member having reinforced side walls is formed, a strap secured to each end of the top member, said straps adapted to secure the pad to a horse collar, a longitudinally extending outwardly projecting welt having a vertical edge formed integral with the top member and along one edge thereof, and a rectangular metallic plate carried by the top member whereby the breaking down of the same is prevented.

4. A horse collar pad comprising an arcuate U shaped bottom member, a reinforcement carried by said bottom member intermediate its ends, an arcuate U shaped top member, said members adapted to be secured together so as to form an open end tube having reinforced walls, a reinforcing strip secured to the top member on its underneath surface, a rectangular metallic plate secured between said top member and said reinforcing member, a strap secured to each end of the top member and having one end located between the top member and the reinforcing member and abutting the metallic plate, and a welt formed integral with and projecting above the top member for holding a hame strap in position thereon, said welt being substantially rectangular in cross section and gradually decreasing in height toward its ends for preventing the forward creeping of a hame strap.

5. A horse collar pad comprising an arcuate bottom member U shaped in cross section, a stiffening member carried by the upper face of said bottom member, an arcuate top member U shaped in cross section and having its edges downturned, the edges of the top member adapted to fit snugly within and against the edges of the bottom member whereby a tubular member having reinforced side walls is formed, a reinforcing plate carried by said top member on its underneath surface, a strap secured to each end of the top member and abutting said reinforcing member, said straps adapted to secure the pad to a horse collar, and a longitudinally extending outwardly projecting rib rectangular in cross section formed on the forward edge of said pad, said rib gradually increasing in height from its ends toward its center.

In testimony whereof I have affixed my signature.

GEORGE P. STEGNER.